United States Patent
Walker et al.

(10) Patent No.: US 6,434,529 B1
(45) Date of Patent: Aug. 13, 2002

(54) SYSTEM AND METHOD FOR REFERENCING OBJECT INSTANCES AND INVOKING METHODS ON THOSE OBJECT INSTANCES FROM WITHIN A SPEECH RECOGNITION GRAMMAR

(75) Inventors: William D. Walker, Nashua, NH (US); Andrew J. Hunt, Medford; Stuart J. Adams, Andover, both of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/505,112

(22) Filed: Feb. 16, 2000

(51) Int. Cl.[7] ................................................ G10L 15/18
(52) U.S. Cl. ........................ 704/275; 704/270; 704/257
(58) Field of Search ................................ 704/275, 270, 704/272, 251, 252, 254, 243, 244, 257

(56) References Cited

U.S. PATENT DOCUMENTS

| | | | | |
|---|---|---|---|---|
| 5,357,596 A | * | 10/1994 | Takebayashi et al. | 704/275 |
| 5,615,296 A | * | 3/1997 | Stanford et al. | 704/201 |
| 5,694,558 A | * | 12/1997 | Sparks et al. | 345/32 |
| 5,774,628 A | * | 6/1998 | Hemphill | 704/255 |
| 5,799,279 A | | 8/1998 | Gould et al. | 704/275 |
| 5,905,773 A | * | 5/1999 | Wong | 379/88.03 |
| 5,983,190 A | * | 11/1999 | Trower, II et al. | 704/276 |
| 5,991,720 A | * | 11/1999 | Galler et al. | 704/256 |
| 6,044,347 A | * | 3/2000 | Abella et al. | 704/272 |
| 6,073,102 A | * | 6/2000 | Block | 704/275 |
| 6,094,635 A | * | 7/2000 | Scholz et al. | 704/270 |
| 6,138,100 A | * | 10/2000 | Dutton et al. | 704/275 |
| 6,163,768 A | * | 12/2000 | Sherwood et al. | 704/235 |
| 6,208,971 B1 | * | 3/2001 | Bellegarda et al. | 704/275 |

FOREIGN PATENT DOCUMENTS

| | | | | |
|---|---|---|---|---|
| EP | 0 872 827 A2 | * | 10/1998 | G10L/3/00 |
| WO | 99/01829 | * | 1/1999 | G10L/5/06 |

* cited by examiner

*Primary Examiner*—Tālivaldis Ivars Šmits
*Assistant Examiner*—Abul K. Azad
(74) *Attorney, Agent, or Firm*—Weingarten, Schurgin, Gagnebin & Lebovici LLP

(57) ABSTRACT

A system and method for referencing object instances of an application program, and invoking methods on those object instances from within a recognition grammar. A mapping is maintained between at least one string formed using characters in the character set of the recognition grammar and instances of objects in the application program. During operation of the disclosed system, when either the application program or script within a recognition grammar creates an application object instance, a reference to the object instance is added to the mapping table, together with an associated unique string. The unique string may then be used within scripting language in tags of the rule grammar, in order to refer to the object instance that has been "registered" by the application program in this way. A tags parser program may be used to interpret such object instance names while interpreting the scripting language contained in tags included in a recognition result object. The tags parser program calls the methods on such object instances directly, eliminating the need for logic in the application program to make such calls in response to the result tag information.

37 Claims, 6 Drawing Sheets

```
        ┌─────────────────────────┐
        │  Create Object Instance │
        │            50           │
        └────────────┬────────────┘
                     │
                     ▼
        ┌─────────────────────────┐
        │  Generate Unique String │
        │            52           │
        └────────────┬────────────┘
                     │
                     ▼
        ┌─────────────────────────────────┐
        │ Load Reference to Object Instance│
        │ and Unique String Into Mapping Table│
        │                54               │
        └─────────────────────────────────┘
```

*Figure 2*

| | Unique String 64 | Associated Object 66 |
|---|---|---|
| 62a | String 1 | Object 1 |
| 62b | String 2 | Object 2 |
| 62c | String 3 | Object 3 |
| 62d | String 4 | Object 4 |
| 62e | String 5 | Object 5 |

Mapping Table 60

*Figure 3*

```
1  #script V1.0
2  grammar food3;                    70
3  ..                                              72
4  <pizzaTopping> = pepperoni | mushrooms | onions | sausage;
5  <pizza> = (pizza | pie ) {this.$value = new Packages.Pizza ( ) ; }
6    [with] ( [ and ] <pizzaTopping> {this.$value.addTopping($) ; } ) * ;
7                                                                    74
8  <burgerTopping> = onions | pickles | tomatoes | lettuce | cheese;
9  <burgerCondiment> = mayo | relish | ketchup | mustard | special sauce;
10 <burger> = {burger | hamburger |) {this.$value=new Packages.Burger ( ); [with]
11  ( [and] ( <burgerTopping> {this.$value.addCondiment ($); }
12           | <burgerCondiment> {this.$value.addCondiment ($); }
13
14  ) * ;
15
16 public <order> =
17  (I (want | would like) a (<pizza> | <burger>) {appObj.sumbitOrder($.$value);};
78
```

1   class MyListener extends ResultAdapter {
2       public void resultAccepted(ResultEvent ev) {
3           FinalRuleResult r = (FinalRuleResult)
4               (ev.getSource( ) );
5               try {
6                       RuleGrammar grammar = r.getRuleGrammar (0)
7                  82   RuleParse rp = grammar.parse ( r, 0,
8                  83         r.getRuleName ( 0 ) ;
9                       getTagsParser ( ) .parseTags (rp)
10          } catch (Exception e) {
11                  e.printStackTrace ( ) ;
12          }
13      }
14  }
```

*Figure 5*

++ RESULT_UPDATED / GRAMMAR_FINALIZED

** AUDIO_RELEASED / TRAINING_INFO_RELEASE

RESULT STATES

SYSTEM AND METHOD FOR REFERENCING OBJECT INSTANCES AND INVOKING METHODS ON THOSE OBJECT INSTANCES FROM WITHIN A SPEECH RECOGNITION GRAMMAR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to speech recognition, and more specifically to a system for providing actions to be performed during processing of recognition results.

Speech recognition systems are available today which allow a computer system user to communicate with an application computer program using spoken commands. In order to perform command and control operations on the application program in response to a users speech, existing speech recognition systems employ a type of speech recognition grammar referred to as a "rule grammar", which is loaded into a speech recognizer program. Rule grammars are also sometimes referred to as "command and control" or "regular" grammars. Rule grammars are often written in a special grammar language that is different from the programming language used to write the application program itself. For example, in a system in which the application program is written in the Java™ programming language provided by Sun Microsystems™, the Java Speech API grammar format (JSGF) may be used to write the rule grammar. Accordingly, application programs and grammars are typically developed and maintained in separate files by different programmers or teams. As a result, the application code that handles the logic of the application is usually separate from the files that define the rule grammars. These factors result in a parallel maintenance problem: changes to the application code may require changes to the rule grammar files and visa versa.

An example of a simple rule grammar for an application program associated with a hypothetical multi-media player is as follows:

```
<play>=(play|go|start){PLAY};
<stop>=(stop|halt|quit running){STOP};
<lineno>=1{ONE}|2{TWO}|3{THREE}|4{FOUR};
<goto>=go to line<lineno>{GOTO};
public <command>=<play>|<stop>|<goto>;
```

In the above illustrative grammar, each line is a recognition rule having a rule name within < > on the left side of the equation, specifically <play>, <stop>, <lineno>, <goto>, and <command>. Rule definitions are on the right side of the equations. In the above example, the rule definitions include a set of one or more alternative utterances (sometimes referred to as "tokens") or rule names separated by "|". The utterances and rule names in each rule definition define the speech patterns matching the rule.

The above rule grammar may be loaded into a speech recognizer program to enable the speech recognizer program to listen for any of the following spoken commands: "play", "go", "start", "stop", "halt", "quit running", "go to line 1", "go to line 2", "go to line 3", and "go to line 4". In existing systems, for an application program to respond to the above commands, the application program must include program logic mapping the specific speech patterns defined by the rule grammar to the appropriate actions. This is sometimes accomplished by embedding static strings, referred to as "tags", in the rule grammar, which are passed to the application program within recognition results from the speech recognizer program. In the above illustrative rule grammar, the tags associated with each rule are shown within curly brackets {}, specifically "{PLAY}", "{STOP}", "{ONE}", "{TWO}", "{THREE}", "{FOUR}", and "{GOTO}".

When the speech recognizer program recognizes a command defined by the rule grammar, the speech recognizer program sends the application program recognition result information describing what was spoken by the user. Result information is passed to the application program in what is sometimes referred to as a "recognition result object." The result information in the recognition result object includes any tag or tags associated with the grammar rule or rules matching what was spoken by the user. The application program then must determine what action or actions are to be performed in response to what was spoken by the user by interpreting the tags in the recognition result.

In more sophisticated existing systems, tags embedded in rule grammars may include or consist of portions of scripting language. For example, a more elaborate rule grammar for a hypothetical multi-media player application program might include the following rules:

```
<lineno>=(1|2|3|4) {line=this.tokens;};
<goto>=go to line <lineno>{action=goto;
    lineno=<lineno>.line;};
<play>=(play|go|start) {action=play;};
<stop>=(stop|halt|quit|running) {action=stop;};
public <command>=<play>|<stop>|<goto>;
```

In the above example, the tag for the <lineno> rule is "line=this.tokens;", which is a scripting language command for assigning the value of the number that was spoken (1, 2, 3 or 4) to a "line" feature field within a feature/value table. Similarly, the tag for the <goto> rule in the above rule grammar is the scripting language "action=goto; lineno=<lineno>.line;". When a user says "go to line 3", the speech recognizer generates a recognition result including the tags "line=this.tokens" and "action=goto; lineno=<lineno>.line;". The application program receives the recognition result, and, for example, passes the tags it contains to a tags parser program for interpretation of the scripting language they contain. The application program may, for example, pass the result object to the tags parser program using the following command:

FeatureValueTable fv=TagsParser.parseResult (recognitionResult);

The above command loads the result from the tag parser program (TagsParser.parseResult), operating on the above tags for example, into the feature/value table "fv". In this example, the tags parser would first associate the value "3" with the "line" field. The tags parser would then associate the value "goto" with the "action" feature and copy the value "3" from the "line" field to the "lineno" feature. This results in logical feature/value pairs stored in the feature/value table fv as follows:

| Feature | Value |
| --- | --- |
| action | goto |
| lineno | 3 |

Upon receipt of the feature/value table, the application program must employ specialized post-processing code to interpret the feature/value pairs it contains. An example of such post-processing is as follows:

```
public void interpretResult(RecognitionResult
    recognitionResult) {
    FeatureValueTable fv=TagsParser.parseResult
        (recognitionResult);
    String action=fv.getvalue ("action");
    if (action.equals("goto")) {
        String lineno=fv.getvalue ("lineno");
        int line=Integer.parseInt(lineno);
        player.goto(line);
    else if (action.equals("play")) {
        player.play( )
    }. . .
}
```

The above code example illustrates the complexity required in the application program to process the feature/value table. Some existing scripting language systems permit class references to be embedded in the scripting language of a tag. Class references are references to globally defined "static" objects as may be obtained using the "static" key word in the Java programming language. The following rule definition shows such an approach:

```
<lineno>=(1 |2|3|4) {line =HelperClass.parseInt(this.tokens)
    ;};
```

The above recognition rule contains a class reference to a static object named "HelperClass". The class reference performs, for example, conversion of the string spoken by the user to an integer value. However, the only permitted references in such systems are class references, and object instance references are not supported.

As discussed above, existing systems suffer from various shortcomings. Specifically, they require cumbersome application program logic to interpret the feature/value pairs received from a tags parser or its equivalent while processing recognition results. Moreover, existing systems impose an undesirable separation between the description of rule results in the rule grammar tag definitions and the handling of such results by the application program.

It would therefore be desirable to have a speech recognition system which reduces the specialized post-processing program logic in an application program that is typically needed to process speech recognition results. The system should also lessen the separation between rule result definition and rule result processing found in existing systems.

BRIEF SUMMARY OF THE INVENTION

A system and method are disclosed for referencing object instances of an application program, and invoking methods on those object instances from within a recognition grammar. The disclosed system also enables application program object instances to be created by the recognition grammar. A mapping is maintained between at least one string formed using characters in the character set of the recognition grammar and instances of objects in the application program. The mappings may be formed either by the application program or by script within the recognition grammar. In an illustrative embodiment, the mappings are maintained in a table, such that an index of a table entry containing a reference to an object instance associated with a given string may be obtained by applying a predetermined function to the string. Alternatively, any other appropriate technique may be used to ensure that the strings are uniquely associated with references to the corresponding object instances.

During operation of the disclosed system, when an object instance is created by either the application program or the recognition grammar, the application program or the recognition grammar may add a reference to the object to the mapping table, together with an associated unique string. The unique string may then be used within scripting language in tags of a rule grammar, in order to refer to the object instance that has been "registered" in this way by the application program. In one embodiment, the mapping table is included in a tags parser utility program that is used to interpret these object instance "names" while parsing the scripting language contained in tags included in a result object. The tags parser program calls methods on such application object instances directly, eliminating the need for the application program to process a feature/value table to determine which methods are to be invoked on which object instances.

With reference to the above media-player application program example, employing an embodiment of the disclosed system allows a unique string "playerName" to be registered by the application program into the mapping table, for example in association with an instance of the multi-media player application program itself. The application program may then be referenced directly from scripting language within the tags defined by the rule grammar. A portion of the rule grammar for such an illustrative embodiment is shown below:

```
<lineno>=(1|2|3|4) {line =HelperClass.parseInt(this.tokens)
    ;};
<goto>=go to line <lineno>{ playerName.goto
    (<lineno>.line);};
<play> (play|go|start) {playerName.play( );};
<stop> (stop|halt|quit running){playerName.stop( );};
public <command>=<play>|<stop>|<goto>;
```

In this illustrative embodiment, a tags parser program is invoked to interpret the tags in a recognition result matching one of the above rules. Accordingly, processing of recognition results in the application program may be simplified to an invocation of the tags parser using such as:

```
public void interpretResult(RecognitionResult
    recognitionResult) {
TagsParser.parseResult(recognitionResult);
}
```

In this way the disclosed system eliminates the need for extensive, costly post-processing of a feature/value table by an application program. Interpretation of tags and the calling of the methods invoked by scripting language contained within the tags may both be done directly by tag parsing code. Since the grammar itself can be used to define actions performed in connection with specific recognized speech, the overall program environment is easier to develop and maintain. Additionally, since application program object instances can be referenced from within the grammar, multiple, simultaneously active instances of a single object class can conveniently be handled.

Thus the disclosed system reduces or eliminates specialized post-processing application program logic used by existing systems to process speech recognition results. The disclosed system also lessens the separation between rule definition and rule result processing found in existing systems.

BRIEF DESCRIPTION OF THE SEVERAL VIEWS OF THE DRAWING

The invention will be more fully understood by reference to the following detailed description of the invention in conjunction with the drawings, of which:

FIG. 2 shows steps performed to register an object instance in a mapping table;

FIG. 3 shows an illustrative embodiment of a mapping table for associating unique strings with object instances;

FIG. 4 shows an illustrative embodiment of a recognition grammar;

FIG. 5 shows an illustrative embodiment of a result listener;

DETAILED DESCRIPTION OF THE INVENTION

Figure 1:
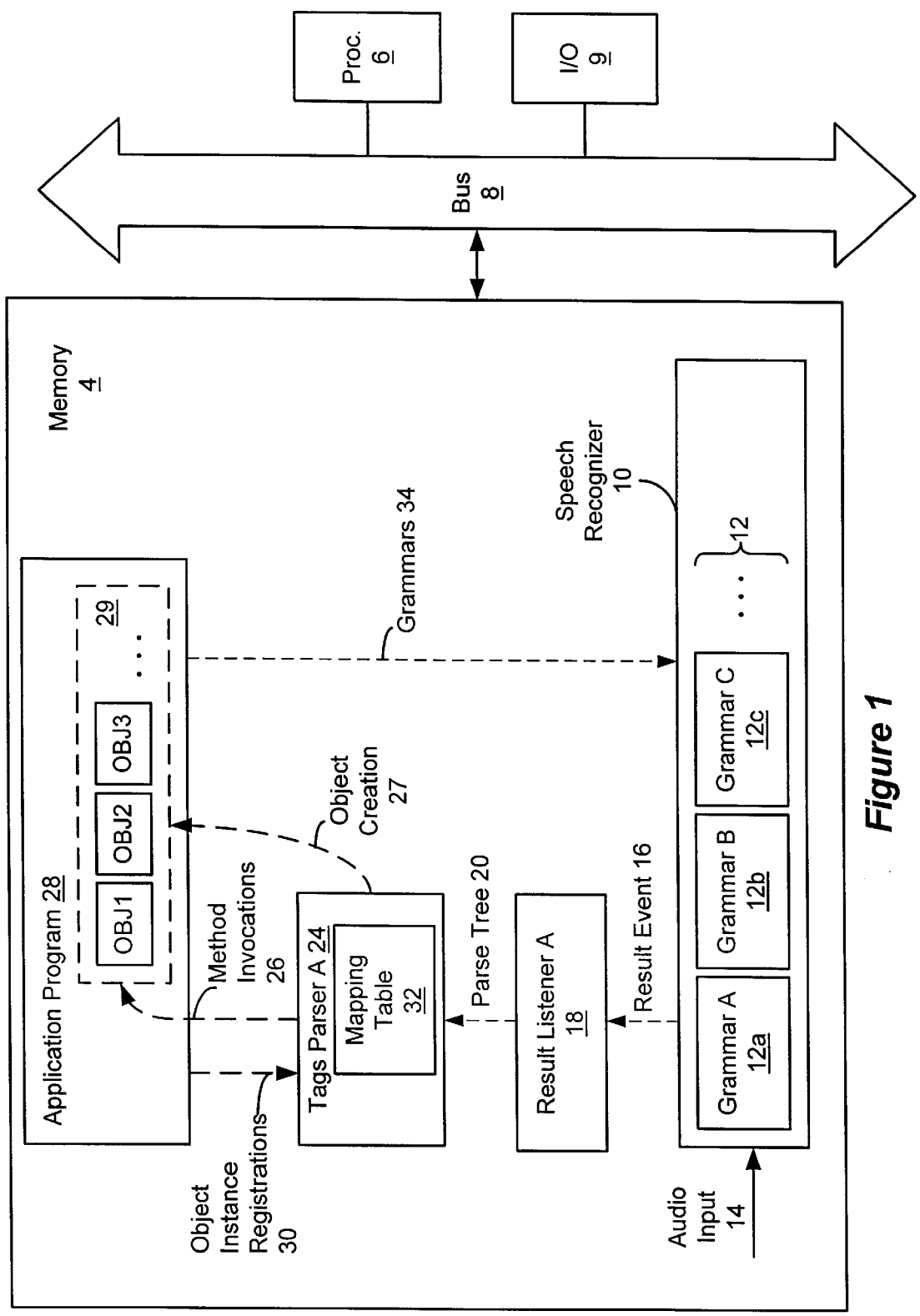
FIG. 1 shows an illustrative embodiment of the disclosed system in a memory within an computer hardware platform.

As shown in FIG. 1, an illustrative embodiment of the disclosed system operates on a hardware platform including a processor 6, a memory 4, and input/output (I/O) devices 9. The I/O devices 9 include some interface for receiving an audio input 14, such as a microphone. The memory 4, processor 6, and input/output devices 9 are, for example, coupled to one or more interconnection buses, such as the bus 8. In the embodiment shown in FIG. 1, various software components are shown in the memory 4, including a speech recognizer program 10, a result listener program 18, a tags parser program 24, an application program 28, and a mapping table 32. The speech recognizer 10 is shown having a number of recognition grammars 12 loaded within it, shown for purposes of example as grammar A 12A, grammar B 12B, grammar C 12C, etc. The application program 28 is shown including a number of object instances 29. While in the illustrative embodiment of FIG. 1 the audio input and recognition results are shown being received from a local input device and speech recognizer, it should be recognized that either the audio input or the recognition results could be obtained from a remote source or device over any appropriate communications medium.

During operation of the embodiment shown in FIG. 1, spoken commands from a user are received into the system through an input device such as a microphone and passed as audio input 14 to the speech recognizer program 10. When a user speaks an utterance matching one or more rules in one of the grammars 12, the recognizer will generate a recognition result event 16 for the result listener 18, which may be part of the application program 28. A recognition result containing the tokens (words) the user said, along with other information such as the grammar and rule name that matched the utterance, is also generated and passed to the result listener 18.

When it receives a recognition result, the result listener uses the grammar from grammars 12 which includes the rule that was matched to turn the result into a parse tree 20. The parse tree 20 can be viewed as a reduced version of the rule grammar, but containing only the rules, tokens, tags, and sequences from the original grammar that correspond to the matching user utterance. In an illustrative embodiment, the parse tree 20 is "flattened", such that parenthesized expressions, optional items, repeated items, and tags from the rule grammar are flattened into a single level of the parse tree 20.

The tags embedded in the rule definitions of the grammars 12 may include scripting language code fragments. The tags parser 24 processes the tags in the parse tree 20 and returns the results in the form of values to the application program 28. As a result of interpreting the scripting language code fragments in the result tags, the tags parser also directly creates and manipulates the object instances 29 in the speech application program 28, as illustrated by the method invocations 26 and object creation 27 shown in FIG. 1.

When the tags parser 24 evaluates the parse tree 20, it creates an object instance, called a rule object, for each rule it encounters in the parse tree 20. The name of a rule object for any given rule is, for purposes of example, of the form $name. That is, the name of the rule object is formed by prepending a '$' to the name of the rule. For example, the names of the rule objects for rules named <topping> and <condiment> would be $topping and $condiment. Alternatively, any other naming convention appropriate for the particular scripting language may be employed.

The tags parser 24 evaluates the parse tree 20 by traversing the parse tree 20 in an in-order fashion and evaluating each rule it encounters during this traversal. It places the rule object for the top level rule (i.e., a public rule that completely matches the user's utterance) in the global scope of a context it created to hold the results of evaluating the parse tree 20. All other rule objects for the recognition result are created as fields of other rule objects in the following way: if a rule contains other rules in its definition, the tags parser 24 creates a rule object for the contained rule as a field of the rule object for the containing rule. Consider the following illustrative rule definitions:

<veggy>=onions|pickles|lettuce|tomato;
<condiment>=mustard|relish|ketchup;
<toppings>=<veggy> and <condiment>;
public <order>=I want a (hamburger|burger) with <toppings>;

When a user says "I want a burger with onions and mustard," the tags parser 24 creates a rule object named $order that represents the rule object for the top level rule, <order>. While the tags parser 24 processes the <order> rule, it creates a rule object for the <toppings> rule named $toppings as a field of $order. As the tags parser 24 evaluates the <toppings> rule, it creates rule objects named $veggy and $condiment as fields in $toppings. When it is finished, the action tags parser will have created the following rule objects:

$order
$order.$toppings
$order.$toppings.$veggy
$order.$toppings.$condiment

In a further aspect of an illustrative embodiment, tags can be used to populate rule objects with other types of values. The tags directly contained in any single rule definition may be grouped together to act something like the body of a constructor for the rule object associated with the rule. This grouping of the tags from a single rule allows tags within that rule to interact with each other. That is, each tag in a rule definition operates under a scoping convention having the following properties:

1) References to fields of the rule object for a rule are qualified using "this".
2) Fields local to the rule object for a rule must be declared using "var".

3) Tag references to fields that are not local fields of the rule object for the rule are interpreted in the nearest enclosing rule object, or in the top level rule object if no enclosing rule object declares the field.

The following rule definition provides an example of using local fields as well as "this":

<dessertItem>=cookies cake|ice cream|pie|brownies;
<ruleA>=I want { var count =0; } (<dessertItem>{ this.count++; } [and] )*;

In the above example, the tags in <ruleA> define and initialize a local field named "count" and then increment it each time the user speaks an utterance matching <dessertItem>. Note that <dessertItem> cannot refer to "this.count" because "count" is a local field of <ruleA>. If two rules need to refer to the same field, this can be accomplished using global fields, as in the following example:

<action>=(hit|feed|tease|photograph) { globalCount++; }
<ruleB>=Please do not { globalCount =0; } (<action> [or])+ the bears;

In the above example, the tag in <ruleB> initializes a global field named "globalCount" and the tag in <action> increments it each time an action is spoken.

The tags parser 24 automatically populates the rule object it creates for each rule with several fields that can be referenced by action tags:

1) "$tokens": to determine the array of tokens of the utterance that apply to the rule and all rules contained by that rule, a tag can refer to the $tokens field of the rule object for that rule. Note that the $tokens field for a rule is not completely populated until the parse of the rule is complete. As a result, tags should only refer to the $tokens fields of other rules. That is, a tag should not attempt to read or modify this.$tokens.

2) "$phrase": to determine the phrase (i.e., a string representing the tokens separated by spaces) that applies to the rule and all rules contained by that rule, a tag can refer to the $phrase field of the rule object for that rule. Like the $tokens field, the $phrase array for a rule is not completely populated until the parse of the rule is complete. As a result, tags should only refer to the $phrase fields of other rules. That is, tags should not attempt to read or modify this.$phrase.

3) "$value": each rule object has what amounts to a "return value." This return value can be any legal value, ranging from primitive types such as ints, booleans, and strings, to actual object instances. The tags parser 24 reserves a field named $value in each rule object to hold this return value, and tags are expected to assign a value to this.$value. If the $value field for a rule is not set, the default value will be the string defined by $phrase.

4) "$name": as previously mentioned, the rule object for each contained rule is added as a field to the containing rule object. Thus, a tag of a rule can refer to the rule object of any contained rule by its rule object name. In an illustrative embodiment, if a rule is referred to more than once in a containing rule definition, then $name refers to the most recently processed reference to the rule.

5) "$": as each contained rule is processed in a rule definition, the $ field for the containing rule is set to point to the rule object of the most recently processed rule. The $ notation is simply provided for convenience to allow shorthand references to rule objects. Also for convenience, the toString method of the rule object for a rule will return the $phrase field for that object, and the toValue method will return the $value field.

Note that just referring to a rule object by its name alone has different results depending upon the context in which it is used. For example, if a scripting language interpreter within or used by the tags parser 24 determines it needs a string value, the reference '$name' will be equivalent to '$name.toString( ).' If such a scripting language interpreter determines it needs any integer value, the reference will be equivalent to '$name.toValue( ).'

Accordingly, through a scripting language interpreter contained within or used by the tags parser 24, tags can take advantage of the full capabilities of the scripting language they include portions of, such as mathematical operations, array references, object creation, etc. to perform useful operations. For example:

public <order>=I want a (hamburger|burger) {
this.$value =1.50;} with ((mushrooms|shrooms) {
this.topping =mushrooms; this.$value+=0.30;}|onions {
this.topping =onions; this.$value+=0.25;});

In the above example, the tags directly calculate a price for the $order object based on which topping is spoken by the user.

Processing of the tags in the parse tree 20 by the tags parser 24 includes processing any method invocations on object instances 29 using the mapping table 32. When the tags parser finds an object instance method invocation, it uses the name of the object instance contained in the scripting language within the tag to index into the mapping table 32. The object instance name as used in the scripting language within the tag is a unique string that is associated with an object instance reference by an entry in the mapping table 32. The tags parser 24 uses the associated object instance reference, located using the mapping table, to perform the method invocation directly on one or more of the object instances 29 in the application program 28.

Also during operation of the embodiment shown in FIG. 1, the application program 28 performs object instance registrations 30 as further described in connection with FIG. 2. The application program 28 additionally loads the grammars 12 into the speech recognizer 10.

FIG. 2 shows steps performed by an application program in an illustrative embodiment to register an object instance. After the object instance is registered, it may be referenced directly from scripting language contained in one or more tags within rules of a recognition grammar. At step 50, the application program creates an object instance. The application program then generates a unique string at step 52. The unique string may be generated using any conventional method ensuring an acceptable level of uniqueness for the specific application. At step 54 the application program loads a reference to the object instance created at step 50 into an entry within a mapping table. The object instance reference is loaded into the mapping table in association with the unique string generated at step 52. Following step 54, the unique string maybe used to locate the object instance reference. For example, in an illustrative embodiment, a function may be applied to the unique string in order to generate an index into the mapping table corresponding to the entry storing the object instance reference. For example, the mapping table may be implemented as a hash table.

FIG. 3 illustrates an embodiment of a mapping table 60, for example corresponding to mapping table 32 as shown in FIG. 1. The mapping table 60 is shown including a number of entries 62. Each of the entries 62 associates a unique string 64 with a reference 66 to an associated object instance. In the case where the mapping table 60 is implemented as a hash table, performing a predetermined hash function on the unique string for a given entry would result in an index for that entry. Conventional methods may be applied for resolving hash collisions or the unique strings and/or hash function may be selected so as to avoid the possibility of hash collisions.

Tags may directly create and manipulate application objects, using a scripting language to access application object instances registered by the application program in the global scope of the tags parser. When the application registers an object instance, it becomes part of the global scope of the action tags parser, and any tags evaluated in that context can refer to the object by its registered name and can manipulate it directly.

FIG. 4 shows an example of a grammar 70 containing scripting language with references to application objects. A rule grammar defines the set of legal utterances a user can say to a speech application. In the illustrative grammar format used herein, each rule may be referred to by a "fully qualified rule name" that is unique across all grammars. A reference to a rule is represented by the rule's fully qualified name in surrounding < > characters. Rules may be defined as "public", in which case they are visible to other grammars. An "import" declaration allows one or all of the public rules of another grammar to be referenced locally. Examples of import declarations are as follows:
import <FullyQualifiedRuleName>;
import <GrammarName.*>;

The first example imports a single rule by its fully qualified rule name. The second import statement requests the import of all public rules of a grammar referred to by its unique GrammarName. The public rules of the designated grammar may be referenced locally. An import statement is optional when an imported rule is always referenced by its fully-qualified rule name.

In the illustrative grammar format, each rule is defined in a rule definition. Two patterns for rule definitions are:
<RuleName>=RuleExpansion ;
public <RuleName>=RuleExpansion ;

The components of the rule definition are (1) an optional public declaration, (2) the name of the rule being defined in surrounding < > characters, (3) an equals sign '=', (4) the expansion of the rule, and (5) a closing semi-colon ';'. The rule expansion defines how the rule may be spoken. The rule expansion is a logical combination of tokens and references to other rules. A single rule may expand into many spoken words plus the expansions of other rules. Any rule in a grammar may be declared as public by the use of the public keyword.

Rule expansions may consist of a token and/or a reference to a rule. For example,
<a>=elephant;
<b>=<x>;
<c>=<com.acme.grammar.y>;

The rule <a> expands to a single token "elephant". Thus, to speak <a> the user must say the word "elephant". The rule <b> expands to <x>. This means that to speak <b>, the user must say something that matches the rule <x>. Similarly, to speak rule <c> the user must speak something that matches the rule identified by the fully qualified name com.acme.grammar.y.

A rule may be defined by a sequence of expansions. A sequence of legal expansions, each separated by any number of spaces, is itself a legal expansion. For example, because both tokens and rule references are legal expansions, the following are both legal rule definitions:
<where>=I live in Boston;
<statement>=this <object> is <OK>;

The items in a sequence may be any legal expansion. This includes logical structures such as alternatives and groups. A rule may be defined as a set of alternative expansions separated by a predetermined character or characters such as a vertical bar '|'. For example:
name>=Michael|Yuriko|Mary|Duke|<otherNames>;

To say the rule <name>, the speaker must say one, and only one, of the items in the set of alternatives. For example, a speaker could say "Michael", "Yuriko", "Mary", "Duke" or anything that matches the rule <otherNames>. However, the speaker could not say "Mary Duke".

Any permitted expansion may be explicitly grouped using matching parentheses '( )'. In such an embodiment, grouping has high precedence and so can be used to ensure the correct interpretation of rules. For example, because sequences have higher precedence than alternatives, parentheses are required in the following rule definition so that "please close" and "please delete" are permitted.
<action>=please (open|close|delete);

The following example shows a sequence of three items, with each item being a set of alternatives surrounded by parentheses to ensure correct grouping:
<command>=(open|close) (windows|doors) (immediately|later);

For the speech recognizer to recognize <command>, the speaker must say one word from each of the three sets of alternatives: for example, "open windows immediately" or "close doors later". Square brackets may be placed around any rule definition to indicate that the contents are optional. In other respects, the square bracket is equivalent to parentheses for grouping and has the same precedence.

Further in the illustrative grammar format, unary operators may be provided in rule expansions. For example, the unary operators are '*' (meaning repeat zero or more times), '+' (meaning repeat one or more times) and tags (attachment of an arbitrary string to any legal expansion). Unary operators share the following features:

1) A unary operator may be attached to any legal rule expansion.

2) A unary operator has high precedence: it attaches to the immediately preceding rule expansion.

3) Only one unary operator can be attached to any rule expansion (there is an exception to this rule for tags).

For example, a rule expansion followed by the asterisk symbol indicates that the expansion may be spoken zero or more times.

As previously noted, tags provide a mechanism in the illustrative grammar format for attaching information and/or scripting language, including references to object instances within an associated application program, to parts of rule definitions. Tags may be used to simplify or enhance the processing of recognition results. Tag attachments do not affect the recognition of a grammar. Instead, the tags are included in the result object returned by the speech recognizer. The software interface of the speech recognizer defines the mechanism for providing tags. As a unary operator, a tag may be attached to any legal rule expansion. The tag is for example a character string delimited by curly braces '{ }'. The tag attaches to the immediately preceding rule expansion. For example:
<rule>=<action>{tag in here};

The following is an example of the relative precedence of elements in a rule expansion. The list proceeds from highest to lowest precedence.

1. Rule name contained within angle brackets, and a quoted or unquoted token.

2. '( )' parentheses for grouping.

3. The unary operators.

4. Sequence of rule expansions.

5. '|' separated set of alternative rule expansions.

As shown in FIG. 4, the scripting language itself may include an operation 72 in the grammar 70 that creates a new application instance of a Java class called Pizza and sets the $value field of an associated rule object to this new Pizza instance. In the scripting language 74, the "addTopping" method of the new Pizza instance is called with the particular topping spoken by the user. Similar tags for handling hamburgers are shown in the <burger> recognition rule 76. The recognition rule 78 includes a tag containing a reference to an application object named "appObj" that was registered by the application. This tag calls, for purposes of example, a "submitorder" method on that object. The submitOrder method of the application object might look like the following:

public void submitOrder(OrderItem item)

{System.out.println("Ordering a "+item+"\n");}

To ensure correct operation, the application program needs to have registered the "appObj" object with the tags parser before asking the tags parser to process a recognition result associated with a recognition rule in the grammar 70 of FIG. 4. In an illustrative embodiment, the application program uses the ObjectTagsParser class that is a subclass of TagsParser to do this. An illustrative code segment that creates the ObjectTagsParser and registers an object with the ObjectTagsParser is as follows:

private ObjectTagsParser getTagsParser( ) { if (tagsParser ==null) { tagsParser =new ObjectTagsParser( );

tagsParser.put("appObj", this);

} return tagsParser;

}

In the above example, a single instance of the ObjectTagsParser is created that is reused for each recognition result. In this way, the application program needs to register object instances only once. Reusing the tags parser instance has an additional benefit: the tags parser can maintain state between recognition result parses. As a result, the tags from one recognition result parse can refer to any global values set by a previous recognition result parse.

In an alternative embodiment, a new ObjectTagsParser instance is created for each recognition result. In this alternative embodiment, the application program must register any object instances with each new tags parser instance in order for them to be referenced from within recognition results.

The "tagsParser.put("appObj", this)" portion of the above getTagsParser method illustrates registration of an object instance with the tags parser using the "put" method. In the example, the application program is registering an instance of itself with the parser using the name "appObj." By doing so, the application program is telling the parser that any references to the name "appObj" from within the tags of a recognition result should use the mapping table to directly manipulate the application program.

An illustrative result handler 80 for the application program is shown in FIG. 5. As shown in FIG. 5, there is no extra processing of the result created by the tags parser. Instead, the processing is handled during the interpretation of the tags themselves. In this way, the logic for interpreting recognition results is actually embedded in the rule grammar. The recognition results are handled directly by the tags: the tags themselves handle the creation of the appropriate OrderItem as well as submitting the order.

The code portion 82 of the result listener 80 determines the rule grammar (RuleGrammar), and the parse tree (RuleParse), for the recognition result. The instruction 83 creates a new tags parser which sets up an internal object it will use to evaluate the tags, and then passes the parse tree to the new tags parser for interpretation.

Figure 6:
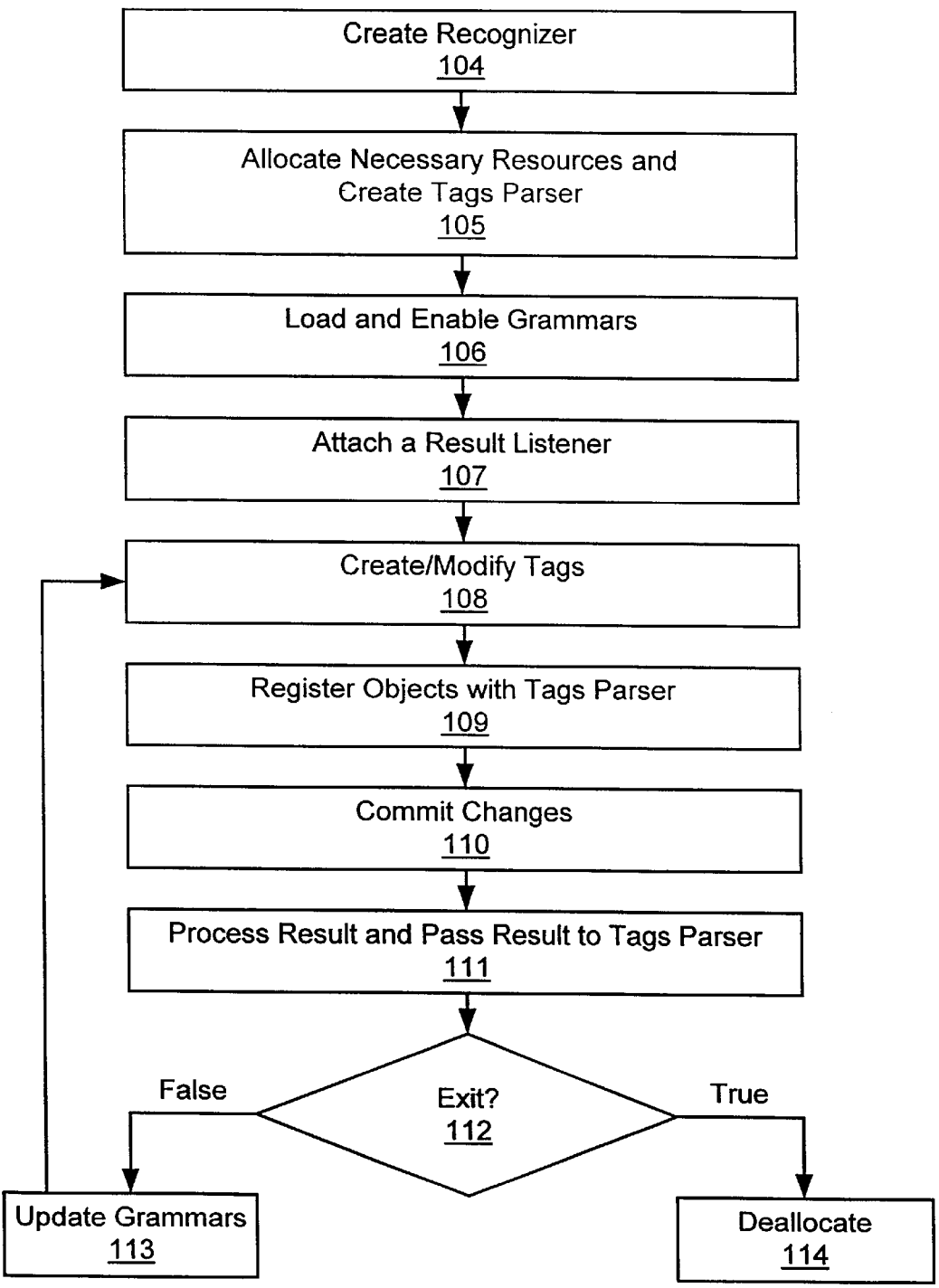
FIG. 6 shows steps performed to process speech recognition results.

FIG. 6 illustrates how to create a speech recognizer (Recognizer), load the recognition grammar, and then wait for the user to say something that matches the grammar. When the Recognizer detects a match, it sends recognition results to the application. If the received command is a "quit" command, then the speech recognizer engine is deallocated.

At step 104 of FIG. 6, an instance of Recognizer is created by calling an associated method or system service. At step 105, necessary resources are allocated for the Recognizer. Step 105 includes creation of a tags parser instance for processing tags contained in result objects received from the recognizer instance created at step 104. At step 106, one or more grammars are loaded into the Recognizer instance and enabled. Subsequently, after the changes are committed at step 110, any enabled grammars will be activated for recognition: that is, the Recognizer will begin comparing incoming audio to the active grammars and listening for speech that matches those grammars. As described below, in an exemplary embodiment, activation and other tangible effects of a grammar and enabling conditions upon recognition do not take effect until the "commit" as described below.

At step 107, one or more result listeners are attached to respective grammar objects loaded within the Recognizer. An attached result listener receives result events relating to result objects associated with the grammar or grammars to which it is attached. These result events indicate progress as the recognition of speech takes place. In one embodiment, a RESULT_ACCEPTED event is provided when the Recognizer completes recognition of input speech that matches an active rule within a grammar.

At step 108, the application program creates and/or modifies recognition grammar tags to reflect its current state. Such changes may include, for example, modifying a grammar or adding a new grammar to include a rule definition having a new tag having a reference to a new or different object instance. For example, a recognition rule may include a tag that fills in the color of a display object to some predetermined color. The application program logic may use such a recognition rule to color in an object that has been selected by a user, for example when the user clicks on the object. Accordingly, when the user clicks on a new object, the application program may register the new object with the tags parser, and then modify the rule to refer to the newly registered object. A recognition match for the modified rule would then make the newly selected display object the predetermined color.

At step 109, the application program, such as application program 28 shown in FIG. 1, registers any new object instances with the tags parser that are to be referenced from result tags. The registration of step 109, for example, includes entering a reference to each object instance a mapping table in association with a unique string.

At step 110, any changes in grammars from steps 113, 108, or 109, including the grammar enabled status and/or creation of a new grammar, are committed to take effect. After step 110, the Recognizer is put into a RESUMED state and a request for speech focus for the Recognizer is issued, for example by way of conventional Recognizer defined methods.

At step 111, in the event that the user speaks something that matches an active grammar, a RESULT_ACCEPTED event is issued to the result listener attached to that grammar. The source of this event is for ago example a result object that contains information about what the Recognizer heard, such as an array of tokens, each of which represents a single spoken word.

Further at step 111, the result listener then uses the tags parser to process any tags in the result object associated with the result event. Processing of any such tags may include interpreting any script language included in the tags. Where such script language includes an operation related to a unique string associated with an application program object instance registered at step 110, then the operation is performed directly by the tags parser using the object instance, by obtaining the object instance reference from the mapping table using the unique string to obtain the appropriate index. Such an operation may be, for example, a method invoked on the application program object instance.

At step 112, the application program may check whether an "Exit" indicator is "true" or "false". For example, an "Exit" indicator may be "true" in the event that a "quit" command was processed. If "Exit" is "true", then step 112 is followed by step 114. Otherwise, step 112 is followed by step 113, in which grammars are updated as necessary. Step 113 is followed by step 108, thus repeating the steps 108 through 111 as needed.

At step 114, a deallocation method is called to free up the Recognizer's resources if the Recognizer is no longer required.

The basic functionality provided by a Recognizer includes grammar management and the production of results when a user says things that match active grammars. In the illustrative embodiment, the Recognizer interface extends an Engine interface to provide this functionality. Some functionality may be inherited from the more general Engine type, while other functionality is specialized. For example, the definition of a Recognizer may add information about dictation capabilities and about users who have trained the engine. On the other hand, Recognizers may be searched, selected and created through methods inherited other classes. Recognizers may also inherit the basic state systems of an engine from an Engine class, including allocation states, pause and resume states, state monitoring methods and the state update events. In addition, Recognizers may produce a number of Engine defined events, while additionally providing events that are specific to Recognizers.

Recognizer State Systems—Inherited States

Figure 7:
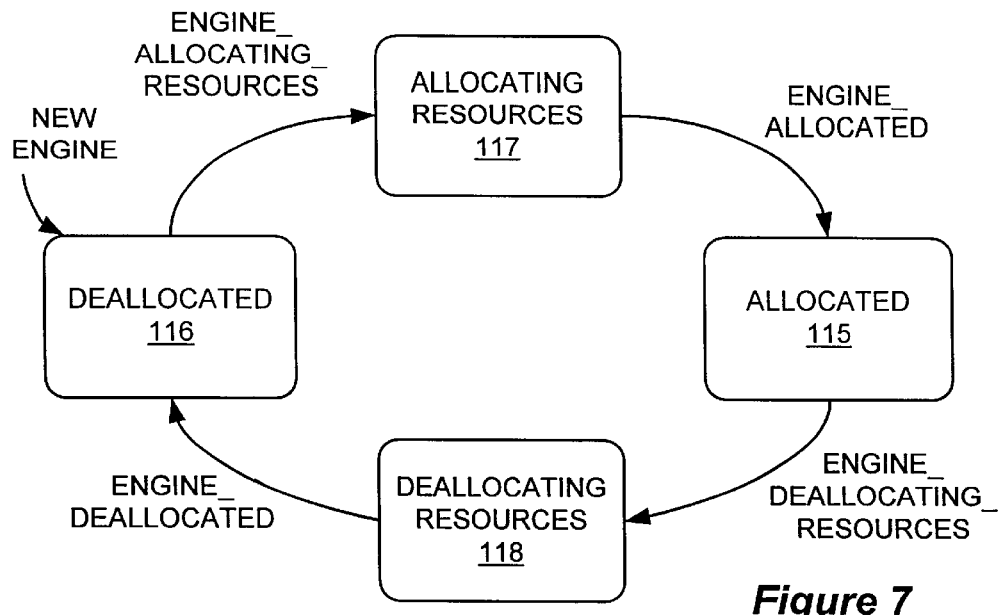
FIG. 7 is a state diagram of an engine object.
Figure 8:
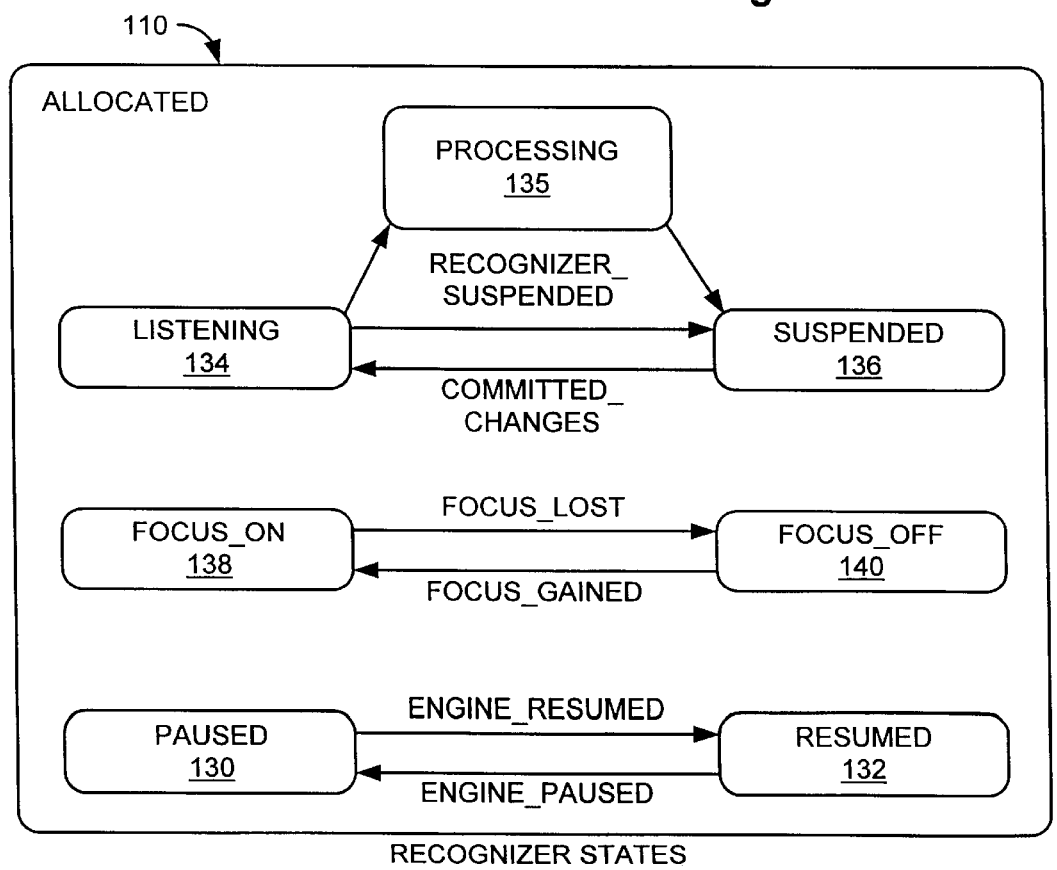
FIG. 8 is a state diagram of a recognizer object.

As mentioned above, a Recognizer object may inherit basic state systems defined in an Engine interface. Two state systems added for Recognizers are provided. These two state systems represent the status of recognition processing of audio input against grammars, and the current Recognizer focus. A basic Engine state system as shown in FIG. 7, representing a current allocation state and whether resources have been obtained. The four allocation states are ALLOCATED 115, DEALLOCATED 116, ALLOCATING_RESOURCES 117 and DEALLOCATING_RESOURCES 118. As shown in FIG. 8, the PAUSED 130 and RESUMED 132 states are sub-states of the ALLOCATED 115 state that may also be of inherited from Engine. The PAUSED 130 and RESUMED 132 states of a Recognizer indicate whether audio input is on or off. Pausing a Recognizer is analogous to turning off the input microphone.

As shown in FIG. 8, the illustrative Recognizer includes two sub-state systems within the ALLOCATED state 115 in addition to the inherited PAUSED and RESUMED sub-state system. These additional two new sub-state systems represent the current activities of a Recognizer's internal processing (the LISTENING 134, PROCESSING 135 and SUSPENDED 136 states) and the current Recognizer focus (the FOCUS_ON 138 and FOCUS_OFF 140 states). These sub-state systems are parallel states to the PAUSED 130 and RESUMED 132 states and operate independently as shown in FIG. 8.

The typical state cycle of a Recognizer starts in the LISTENING state 134, moves to the PROCESSING state 135 while a user speaks, moves to the SUSPENDED state 136 once recognition of that speech is completed and while grammars are updates in response to user input, and finally returns to the LISTENING state 134. In this event cycle a Result object is typically produced that represents what the Recognizer heard. Each Result has a state system as shown in FIG. 8 and further described below.

Another illustrative Recognizer event cycle also starts in the LISTENING state 134. Upon receipt of a non-speech event (e.g., keyboard event, mouse click, timer event) the Recognizer is suspended temporarily while grammars are updated in response to the event, and then the Recognizer returns to listening.

The typical recognition state cycle for a Recognizer occurs as speech input occurs. This cycle represents the recognition of a single Result. The cycle may be described as a clockwise trip through the LISTENING, PROCESSING and SUSPENDED states of an ALLOCATED recognizer as shown in FIG. 8.

The Recognizer starts in the LISTENING state 134 with a certain set of grammars enabled and active. When incoming audio is detected that may match an active grammar, the Recognizer transitions from the LISTENING state 134 to the PROCESSING state 135 with a RECOGNIZER_PROCESSING event.

The Recognizer then creates a new Result object and issues a RESULT_CREATED event (a ResultEvent) to provide the Result to ResultListeners attached to a grammar including the rule associated with the Result. At this point the Result is usually empty: it does not contain any recognized words. As recognition proceeds words are added to the Result along with other useful information.

The Recognizer remains in the PROCESSING state 135 until it completes recognition of the Result. While in the PROCESSING state 135 the Result may be updated with new information.

The Recognizer indicates completion of recognition by issuing a RECOGNIZER_SUSPENDED event to transition from the PROCESSING state 135 to the SUSPENDED state 136. Once in that state, the Recognizer issues a result finalization event to ResultListeners (either a RESULT_ACCEPTED or RESULT_REJECTED event) to indicate that all information in the Result is finalized (words, grammars, audio etc.).

The Recognizer remains in the SUSPENDED state 136 until processing of the result finalization event is completed. Grammar changes may be made during the result finalization because a result caused a change in state or context relevant to the application program.

In the SUSPENDED state 136 the Recognizer buffers incoming audio. This buffering allows a user to continue speaking without speech data being lost. Once the Recognizer returns to the LISTENING state B14 the buffered audio is processed to give the user the perception of real-time processing.

Once the result finalization event has been issued to all listeners, the Recognizer automatically commits all grammar changes and issues a CHANGES_COMMITTED event to return to the LISTENING state. It also issues GRAMMAR_CHANGES_COMMITTED events to GrammarListeners of changed grammars. The commit applies all grammar changes made at any point up to the end of result finalization, such as changes made in the result finalization events. The Recognizer is now back in the LISTENING state 134 listening for speech that matches the new grammars.

In this event cycle the first two Recognizer state transitions (marked by RECOGNIZER_PROCESSING and RECOGNIZER_SUSPENDED events) are triggered by user actions: starting and stopping speaking. The third state transition (CHANGES_COMMITTED event) is triggered programmatically some time after the RECOGNIZER_SUSPENDED event. The SUSPENDED state 136 serves as a temporary state in which Recognizer configuration can be updated without loosing audio data.

Grammar Updates and Non-Speech Event Cycles

When a non-speech event occurs, such as a mouse or keyboard initiated event, and that event changes the application state or application data, it may be necessary to update the recognizer's grammars. The suspend and commitChanges methods of a Recognizer are used to handle non-speech asynchronous events. The typical cycle for updating grammars in response to a non-speech asynchronous events is as follows.

Assume that the Recognizer is in the LISTENING state 134 (the user is not currently speaking). As soon as the event is received, a call to suspend is made to indicate that a grammar change is about to be made. In response, the Recognizer issues a RECOGNIZER_SUSPENDED event and transitions from the LISTENING state 134 to the SUSPENDED state 136.

With the Recognizer in the SUSPENDED state 136, all necessary changes to the grammars can be made. Once all grammar changes are completed a call is made to the commitchanges method. In response, the Recognizer applies the new grammars and issues a CHANGES COMMITTED event to transition from the SUSPENDED state 136 back to the LISTENING state 134, and issues GRAMMAR_CHANGES_COMMITTED events with respect to all changed grammars to all GrammarListeners for the modified grammars. Finally, the Recognizer resumes recognition of the buffered audio and then live audio with the new grammars.

Grammar Interface

Rule grammars can be defined to capture a wide range of spoken input from users by the progressive linking of simple grammars and rules. A Recognizer may have many rule grammars loaded at any time. The Grammar interface is the root interface that is extended by all grammars. The grammar functionality that is shared by all grammars is presented through this interface. The RuleGrammar interface is an extension of the Grammar interface to support rule grammars. The following are the capabilities presented by the Grammar interface:

Grammar naming: Every grammar loaded into a Recognizer must have a unique name. The getName method of a Recognizer returns that name. Grammar names allow references to be made between grammars. For example, a grammar from Acme Corp. for dates might be called "com.acme.speech.dates".

Enabling and disabling: Grammars may be enabled or disabled using the setEnabled method. When a grammar is enabled and when specified activation conditions are met, such as the Recognizer gaining focus, the grammar is activated. Once a grammar is active a Recognizer will listen to incoming audio for speech that matches that grammar.

Activation: the isActive method returns a Boolean value that indicates whether a grammar is currently active for recognition.

GrammarListener: the addGrammarListener and removeGrammarListener methods allow a GrammarListener to be attached to and removed from a grammar. The GrammarEvents issued to the listener indicate when grammar changes have been committed and whenever the grammar activation state of a grammar changes.

ResultListener: the addResultListener and removeResultListener methods allow a ResultListener to be attached to and removed from a grammar. This listener receives notification of all events for any result that matches the grammar.

Recognizer: the getRecognizer method returns a reference to the Recognizer into which the grammar is loaded.

Committing Changes

The disclosed system supports dynamic grammars; that is, it supports the ability to modify grammars at runtime. In the case of rule grammars any aspect of any grammar can be changed at any time. After making any change to a grammar, the changes must be committed. This applies to changes in definitions of rules (including tags) or enabling conditions.

Changes are committed by calling the commitChanges method of the Recognizer. The commit is required for changes to affect the recognition process: that is, the processing of incoming audio. The commit changes mechanism has two important properties:

Updates to grammar definitions and the enabled property take effect atomically—all changes take effect at once. There are no intermediate states in which some, but not all, changes have been applied.

The commitchanges method is a method of Recognizer so all changes to all grammars are committed at once. Again, there are no intermediate states in which some, but not all, changes have been applied.

There is one instance in which changes are committed without an explicit call to the commitchanges method. Whenever a recognition result is finalized (completed), an event is issued to ResultListeners (it is either a RESULT_ACCEPTED or RESULT_REJECTED event). Once processing of that event is completed changes are normally committed. This supports the common situation in which changes are often made to grammars in response to something a user says.

A grammar is active when the Recognizer is matching incoming audio against that grammar to determine whether the user is saying anything that matches that grammar. When a grammar is inactive it is not being used in the recognition process.

Methods may be provided for enabling and disabling a grammar or individual public rules within a grammar. The enabled state of a grammar is set with the setEnabled method and tested with the isEnabled method. Once enabled, certain conditions must be met for a grammar to be activated. The enabled flag and the activation mode are both parameters of a grammar that need to be committed to take effect. Changes need to be committed to affect the recognition processes.

Grammars may be dynamically modified and updated at execution time. The changes allow an to account for shifts in the application's context, changes in the data available to it, and so on. For example, in an email application the list of known users may change during the normal operation of the program. The <sendEmail> command,
<sendEmail>=send email to <user>;
references the <user> rule which may need to be changed as new email arrives. This code snippet shows the update and commit of a change in users.
Recognizer rec;
RuleGrammar gram;
String names[ ]={"amy", "alan", "paul"};
Rule userRule =new RuleAlternatives(names);
gram.setRule("user", userRule);
// apply the changes
rec.commitchanges( );

Recognition Results

A recognition result is provided by a Recognizer to a ResultListener when the Recognizer "hears" incoming speech that matches an active grammar. The result may provide words the user said and provides a range of other useful information, including alternative guesses and audio data.

There are two illustrative ways to finalize a result which are signaled by the RESULT_ACCEPTED and RESULT_REJECTED events. A result is accepted when a Recognizer is confident that it has correctly heard the words spoken by a user (i.e., the tokens in the Result exactly represent what a user said).

Rejection occurs when a Recognizer is not confident that it has correctly recognized a result: that is, the tokens and other information in the result do not necessarily match what a user said. Many applications will ignore the RESULT_REJECTED event and most will ignore the detail of a result when it is rejected. In some applications, a RESULT_REJECTED event is used simply to provide users with feedback that something was heard but no action was taken, for example, by displaying "???" or sounding an error beep.

A Result is produced in response to a user s speech. Unlike keyboard input, mouse input and most other forms of user input, speech is not instantaneous. As a consequence, a speech recognition result is not produced instantaneously. Instead, a Result is produced through a sequence of events starting some time after a user starts speaking and usually finishing some time after the user stops speaking, although it is recognized that any delay period will continue to decrease as recognition methods improve and processing speeds increase.

Figure 9:
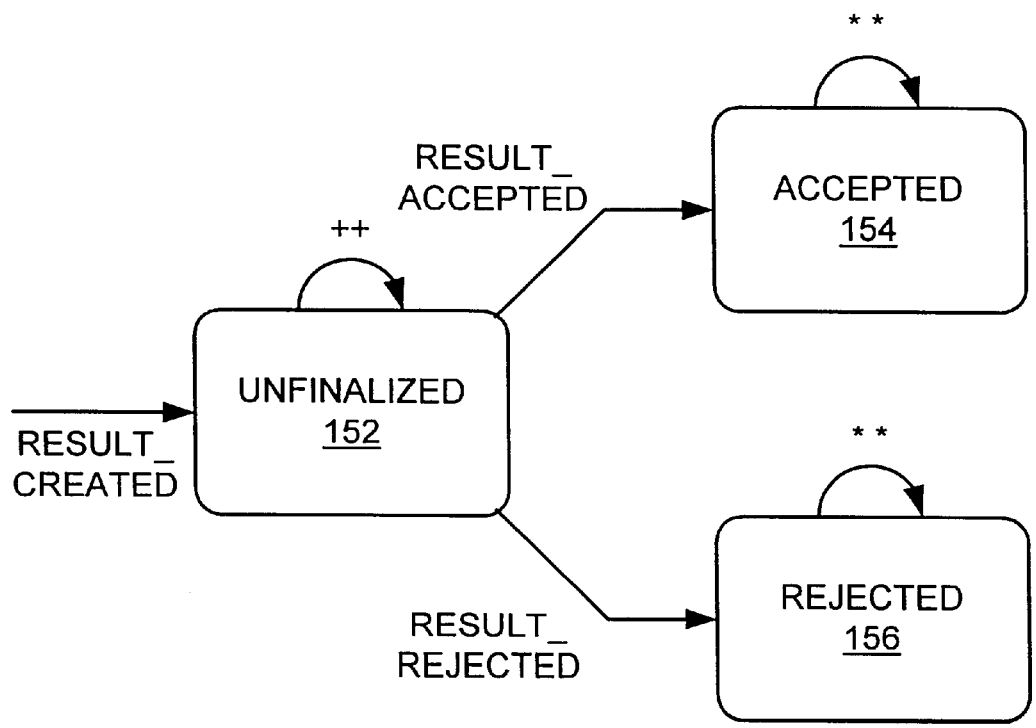
FIG. 9 is a state diagram of a result object.

FIG. 9 shows the state system of a result object (Result) and the associated ResultEvents. As in the Recognizer state diagram (FIG. 8), the blocks represent states, and the labeled arcs represent transitions that are signaled by ResultEvents.

Every result starts in the UNFINALIZED state 152 when a RESULT_CREATED event is issued. While the result is unfinalized, the Recognizer provides information including finalized and unfinalized tokens and the identity of the grammar matched by the result. As this information is added, the RESULT_UPDATED and GRAMMAR_FINALIZED events are issued.

Once all information associated with the result is finalized, the result is finalized. A result is finalized with either a RESULT_ACCEPTED or RESULT_REJECTED event placing it in either the ACCEPTED state 154 or REJECTED state 156. At that point all information associated with the result becomes available. Once finalized, the information available is fixed.

ResultListener Attachment

A result listener (ResultListener) can be attached in one of three places to receive events associated with results: to a Grammar, to a Recognizer or to an individual Result. To support ResultListeners the Grammar, Recognizer and Result interfaces all provide addResultListener and removeResultListener methods. Depending upon the place of attachment, a listener receives events for different results and different subsets of result events.

Grammar: A ResultListener attached to a Grammar receives all ResultEvents for any Result that has been finalized to match that grammar. Because the grammar is known once a GRAMMAR_FINALIZED event is produced, a ResultListener attached to a Grammar receives that event and subsequent events.

Result: A ResultListener attached to a Result receives all ResultEvents starting at the time at which the listener is attached to the Result. Note that because a listener cannot be attached until a result has been created with the RESULT_CREATED event, it can never receive that event.

Recognizer: A ResultListener attached to a Recognizer receives all ResultEvents for all results produced by that Recognizer for all grammars. This form of listener attachment is useful when centralized processing of results is required. Only ResultListeners attached to a Recognizer receive the RESULT_CREATED event.

Recognizer and Result States

The state system of a Recognizer is tied to the processing of a Result. Specifically, the LISTENING 134, PROCESSING 135 and SUSPENDED 136 state cycle shown in FIG. 8 follows the production of an event. The transition of a Recognizer from the LISTENING state 134 to the PROCESSING state 135 with a RECOGNIZER_PROCESSING event indicates that a Recognizer has started to produce a Result. The RECOGNIZER_PROCESSING event is followed by the RESULT_CREATED event to ResultListeners. The RESULT_UPDATED and GRAMMAR_FINALIZED events are issued to ResultListeners while the Recognizer is in the PROCESSING state 135.

As soon as the Recognizer completes recognition of a result, it makes a transition from the PROCESSING state 135 to the SUSPENDED state 136 with a RECOGNIZER_SUSPENDED event. Immediately following that recognizer event, the result finalization event (either RESULT_ACCEPTED or RESULT_REJECTED) is issued. While the result finalization event is processed, the Recognizer remains suspended. Once the result finalization event is completed, the Recognizer automatically transitions from the SUSPENDED state 136 back to the LISTENING state 134 with a CHANGES_COMMITTED event. Once back in the LISTENING state 134 the Recognizer resumes processing of audio input with the grammar committed with the CHANGES_COMMITTED event.

In some situations, grammar definitions, including tag scripts contained in recognition rules, as well as grammar activation states need to be updated in response to spoken input from a user. For example, if speech is added to a traditional email application, the command "save this message" might result in a window being opened in which a mail folder can be selected. While that window is open, the grammars that control that window need to be activated. Thus during the event processing for the "save this message" command grammars may need to be created, updated and enabled. All this would happen during processing of the RESULT_ACCEPTED event. For any grammar changes to take effect they must be committed.

Because this form of grammar update is common while processing the RESULT_ACCEPTED event (and sometimes the RESULT_REJECTED event), Recognizers implicitly commit grammar changes after either result finalization event has been processed. This implicit commit is indicated by the CHANGES_COMMITTED event that is issued when a Recognizer makes a transition from the SUSPENDED state 136 to the LISTENING state 134 following result finalization and the result finalization event processing.

One desirable effect of this form of commit becomes useful where multiple grammars are changed in response to a finalized result. If changes in multiple program modules are triggered by a finalized result event, and if many grammars are changed as a result, then they do not each need to call the commitChanges method. The downside of multiple calls to the commitChanges method is that a syntax check must be performed upon each. Checking syntax can be computationally expensive and so multiple checks are undesirable. With the implicit commit once all components have updated grammars computational costs are reduced.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

In an exemplary hardware platform on which a software based implementation of the present invention would execute, the program code executes on one or more processors, for example a microprocessor. The program code may be stored in, and may be executed on the processor from, a memory such as a Random Access Memory (RAM) or Read Only Memory (ROM). The memory storing the program code is communicable with the processor, for example by way of a memory bus. In addition, the exemplary platform may include various input/output (I/O) devices, such as a keyboard and mouse, as well as secondary data storage devices such as magnetic and/or optical disks.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to certain properties and features of the Java programming language and execution environment, the present invention is generally applicable to any other programming language or execution environment in which speech recognition is performed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method of processing speech recognition results, comprising:
    creating an object instance in an application computer program;
    storing, by said application computer program in response to said creating said object instance, a reference to said object instance in association with an identifier;
    receiving indication that a portion of speech matching a rule in a recognition grammar has been detected, said rule in said recognition grammar including a portion of script, said portion of script including said identifier and indicating an operation to be performed on said object instance in said application computer program; and
    processing said portion of script included in said rule in said recognition grammar, responsive to said detection of said portion of speech matching said rule in said recognition grammar, said processing including performing said operation to be performed on said object instance in said application computer program.

2. The method of claim 1, wherein said storing said reference further comprises storing said reference to said object instance in an entry in a table, and wherein said performing said operation to be performed on said object instance comprises obtaining said reference to said object instance from said table.

3. The method of claim 2, wherein said storing said reference to said object instance in said table comprises storing said reference to said object instance in an entry in said table, and wherein said performing said operation to be performed on said object instance further comprises performing a function on said identifier to obtain an index of said entry in said table.

4. The method of claim 2, wherein said storing said reference to said object instance in said table comprises storing said reference to said object instance in an entry in said table, wherein said identifier comprises an index of said entry in said table.

5. The method of claim 1, further comprising generating a unique string, wherein said identifier comprises said unique string.

6. The method of claim 1, wherein said portion of script comprises script operable to perform said step of creating said object instance, and wherein said processing said portion of script comprises said step of creating said object instance.

7. The method of claim 6, wherein said processing said portion of script further comprises said step of storing said reference to said object instance, responsive to said step of creating said object instance.

8. The method of claim 7, wherein said object instance is an application computer program object instance, and wherein said steps of receiving and processing are performed in a speech recognition result processing utility computer program.

9. The method of claim 1, wherein said creating and said storing are performed by a first computer program loaded in a memory, and wherein said receiving and processing are performed by a second computer program loaded in said memory.

10. The method of claim 1, wherein said indication that a portion of speech matching a rule in a recognition grammar has been detected is received over a communications network from a remote speech recognition system.

11. The method of claim 10, wherein said remote speech recognition system comprises a computer system including speech recognizer software loaded in a memory.

12. The method of claim 1, wherein said creating and said storing are embodied within a first computer program loaded in a memory, and wherein said processing is embodied within a second computer program loaded in said memory.

13. The method of claim 12, wherein said first computer program comprises an application computer program and wherein said second computer program comprises a tags parser computer program.

14. The method of claim 13, wherein said object instance is an object instance of said application computer program.

15. The method of claim 1, wherein said operation on said object instance is a method invocation.

16. The method of claim 1, further comprising generating a parse tree, wherein said parse tree includes said rule in said recognition grammar.

17. The method of claim 1, further comprising:
   detecting a second portion of speech matching said rule in said recognition grammar, and
   processing said portion of script included in said rule in said recognition grammar, responsive to said detection of said second portion of speech matching said rule in said recognition grammar, said processing including performing said operation to be performed on said object instance.

18. A system for processing speech recognition results, comprising:
   logic operable to create an object instance in an application computer program;
   logic, in said application computer program, operable to store, in response to said creating said object instance, a reference to said object instance in association with an identifier;
   logic operable to receive indication that a portion of speech matching a rule in a recognition grammar has been detected, said rule in said recognition grammar including a portion of script, said portion of script including said identifier and indicating an operation to be performed on said object instance in said application computer program; and
   logic operable to process said portion of script included in said rule in said recognition grammar, responsive to said detection of said portion of speech matching said rule in said recognition grammar, said processing including performing said operation to be performed on said object instance in said application computer program.

19. The system of claim 18, wherein said logic for storing said reference further comprises logic for storing said reference to said object instance in an entry in a table, and wherein said logic for performing said operation to be performed on said object instance comprises logic for obtaining said reference to said object instance from said table.

20. The system of claim 19, wherein said logic for storing said reference to said object instance in said table comprises logic for storing said reference to said object instance in an entry in said table, and wherein said logic for performing said operation to be performed on said object instance further comprises logic for performing a function on said identifier to obtain an index of said entry in said table.

21. The system of claim 19, wherein said logic for storing said reference to said object instance in said table comprises logic for storing said reference to said object instance in an entry in said table, wherein said identifier comprises an index of said entry in said table.

22. The system of claim 18, further comprising logic for generating a unique string, wherein said identifier comprises said unique string.

23. The system of claim 18, wherein said portion of script comprises script operable to perform said step of creating said object instance, and wherein said logic for processing said portion of script comprises said logic for creating said object instance.

24. The system of claim 23, wherein said logic for processing said portion of script further comprises said logic for storing said reference to said object instance, responsive to said step of creating said object instance.

25. The system of claim 24, wherein said object instance is an application computer program object instance, and wherein said logic for receiving and logic for processing comprise program logic in a speech recognition result processing utility computer program loaded in a computer system memory.

26. The system of claim 18, wherein said logic for creating and said logic for storing are embodied, at least in part, within a first computer program loaded in a memory, and wherein said logic for receiving and logic for processing are embodied, at least in part, within a second computer program loaded in said memory.

27. The system of claim 18, further comprising logic for receiving said indication that a portion of speech matching a rule in a recognition grammar has been detected over a communications network from a remote speech recognition system.

28. The system of claim 27, wherein said remote speech recognition system comprises a computer system including speech recognizer software loaded in a memory.

29. The system of claim 18, wherein said logic for creating and said logic for storing are embodied within a first computer program loaded in a memory, and wherein said logic for processing is embodied within a second computer program loaded in said memory.

30. The system of claim 29, wherein said first computer program comprises an application computer program and wherein said second computer program comprises a tags parser computer program.

31. The system of claim 30, wherein said object instance is an object instance of said application computer program.

32. The system of claim 18, wherein said operation on said object instance is a method invocation.

33. The system of claim 18, further comprising logic for generating a parse tree, wherein said parse tree includes said rule in said recognition grammar.

34. The system of claim 18, further comprising:
   logic for detecting a second portion of speech matching said rule in said recognition grammar, and
   logic for processing said portion of script included in said rule in said recognition grammar, responsive to said logic for detecting said second portion of speech matching said rule in said recognition grammar, said logic for processing including logic for performing said operation to be performed on said object instance.

35. A system for performing speech recognition, comprising:
   means for creating an object instance in an application computer program;
   means for storing, by said application computer program, in response to said creating of said object instance in said application computer program, a reference to said object instance in association with an identifier;

means for receiving indication that a portion of speech matching a rule in a recognition grammar has been detected, said rule in said recognition grammar including a portion of script, said portion of script including said identifier and indicating an operation to be performed on said object instance in said application computer program; and means for processing said portion of script included in said rule in said recognition grammar, responsive to said detection of said portion of speech matching said rule in said recognition grammar, said means for processing including means for performing said operation to be performed on said object instance in said application computer program.

36. A computer program product including a computer readable medium, said computer readable medium having at least one computer program stored thereon, said at least one computer program comprising:

program code for creating an object instance in an application computer program;

program code for storing, by said application computer program in response to said creating said object instance in said application computer program, a reference to said object instance in association with an identifier;

program code for receiving indication that a portion of speech matching a rule in a recognition grammar has been detected, said rule in said recognition grammar including a portion of script, said portion of script including said identifier and indicating an operation to be performed on said object instance in said application computer program; and program code for processing said portion of script included in said rule in said recognition grammar, responsive to said program code for detection of said portion of speech matching said rule in said recognition grammar, said program code for said portion of script processing including program code for performing said operation to be performed on said object instance in said application computer program.

37. A computer data signal embodied in a carrier wave, said computer data signal including at least one computer program, said at least one computer program comprising:

program code for creating an object instance in an application computer program;

program code for storing a reference to said object instance in said application computer program, responsive to said creating said object instance in said application computer program, in association with an identifier;

program code for receiving indication that a portion of speech matching a rule in a recognition grammar, said rule in said recognition grammar including a portion of script, said portion of script including said identifier and indicating an operation to be performed on said object instance in said application computer program; and program code for processing said portion of script included in said rule in said recognition grammar, responsive to said program code for detecting of said portion of speech matching said rule in said recognition grammar, said program code for processing said portion of script including program code for performing said operation to be performed on said object instance in said application computer program.

* * * * *

UNITED STATES PATENT AND TRADEMARK OFFICE
CERTIFICATE OF CORRECTION

PATENT NO. : 6,434,529 B1  Page 1 of 1
DATED : August 13, 2002
INVENTOR(S) : William D. Walker et al.

It is certified that error appears in the above-identified patent and that said Letters Patent is hereby corrected as shown below:

Column 2,
Line 33, "quit/running" should read -- quit running --;

Column 3,
Line 23, "else" should read -- } else --;

Column 11,
Line 14, ""submitorder"" should read -- "submitOrder" --;
Line 29, "(tagsParser=null)" should read -- (tagsParser = = null) --;

Column 13,
Line 4, delete "ago";

Column 15,
Line 42, "commitchanges" should read -- commitChanges --;
Line 43, "CHANGES COMMITTED" should read -- CHANGES_COMMITTED --;

Column 16,
Line 47, "commitchanges" should read -- commitChanges --;

Column 17,
Line 17, "rec.commitchanges ( );" should read -- rec.commitChanges ( ); -- and
Line 40, "user s" should read -- user's --.

Signed and Sealed this

Seventh Day of October, 2003

JAMES E. ROGAN
*Director of the United States Patent and Trademark Office*